United States Patent
Izumi et al.

(10) Patent No.: US 9,878,518 B2
(45) Date of Patent: *Jan. 30, 2018

(54) JOINED BODY

(71) Applicant: NGK Insulators, Ltd., Nagoya (JP)

(72) Inventors: Yunie Izumi, Nisshin (JP); Yoshimasa Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 206 days.

This patent is subject to a terminal disclaimer.

(21) Appl. No.: 14/873,311

(22) Filed: Oct. 2, 2015

(65) Prior Publication Data

US 2016/0096341 A1    Apr. 7, 2016

Related U.S. Application Data

(60) Provisional application No. 62/059,215, filed on Oct. 3, 2014.

(51) Int. Cl.
| | | |
|---|---|---|
| *B32B 7/02* | (2006.01) | |
| *C04B 37/02* | (2006.01) | |
| *B32B 7/04* | (2006.01) | |
| *B32B 9/00* | (2006.01) | |
| *B32B 9/04* | (2006.01) | |
| *H01B 5/02* | (2006.01) | |
| *H01B 5/16* | (2006.01) | |
| *C04B 38/00* | (2006.01) | |
| *C04B 37/00* | (2006.01) | |

(52) U.S. Cl.
CPC ............... *B32B 7/02* (2013.01); *B32B 7/04* (2013.01); *B32B 9/005* (2013.01); *B32B 9/041* (2013.01); *C04B 37/005* (2013.01); *C04B 37/006* (2013.01); *C04B 37/023* (2013.01); *C04B 38/0019* (2013.01); *H01B 5/02* (2013.01); *H01B 5/16* (2013.01); *B32B 2307/202* (2013.01); *C04B 2237/068* (2013.01); *C04B 2237/122* (2013.01); *C04B 2237/123* (2013.01); *C04B 2237/365* (2013.01); *C04B 2237/582* (2013.01); *C04B 2237/708* (2013.01); *C04B 2237/72* (2013.01)

(58) Field of Classification Search
CPC ....................................................... B32B 7/02
USPC .................. 428/332, 446; 156/89.11, 89.28
See application file for complete search history.

(56) References Cited

U.S. PATENT DOCUMENTS

| | | | |
|---|---|---|---|
| 4,629,662 A | 12/1986 | Brownlow et al. | |
| 6,890,665 B1 | 5/2005 | Tanida | |
| 8,137,802 B1 | 3/2012 | Loehman et al. | |
| 2015/0344041 A1 | 12/2015 | Green | |
| 2016/0002110 A1* | 1/2016 | Izumi .................. | B32B 15/04 428/332 |
| 2016/0046531 A1 | 2/2016 | Izumi et al. | |
| 2016/0096777 A1* | 4/2016 | Izumi .................. | B32B 9/005 428/116 |
| 2016/0099089 A1* | 4/2016 | Izumi .............. | H01B 13/0016 428/213 |

FOREIGN PATENT DOCUMENTS

| | | |
|---|---|---|
| EP | 2 977 363 A1 | 1/2016 |
| JP | 06-001670 A1 | 1/1994 |
| JP | 2001-220252 A1 | 8/2001 |
| JP | 2011-246340 A1 | 12/2011 |
| WO | 2014/148533 A1 | 9/2014 |
| WO | 2014/148534 A1 | 9/2014 |

OTHER PUBLICATIONS

U.S. Appl. No. 14/873,263, filed Oct. 2, 2015, Izumi, et al.
U.S. Appl. No. 14/873,327, filed Oct. 2, 2015, Izumi et al.
U.S. Appl. No. 14/873,348, filed Oct. 2, 2015, Izumi et al.
U.S. Appl. No. 14/873,291, filed Oct. 2, 2015, Izumi et al.
Extended European Search Report (Application No. 15188202.4) dated Feb. 12, 2016.
U.S. Office Action (Related U.S. Appl. No. 14/873,263) dated May 15, 2007.
U.S. Appl. No. 14/848,938, filed Sep. 9, 2015, Izumi, et al.
U.S. Appl. No. 14/856,629, filed Sep. 17, 2015, Izumi, et al.

* cited by examiner

*Primary Examiner* — Terressa Boykin
(74) *Attorney, Agent, or Firm* — Burr & Brown, PLLC

(57) ABSTRACT

A joined body 20 includes a first member 21 which is a ceramic containing Si, a second member 22, and a joining portion 30 which is formed of an electrically conductive oxide containing a $Fe_3O_4$ phase and which joins the first member 21 and the second member 22. In the joined body 20, no reaction layer is preferably formed at a joining interface between the electrically conductive oxide and the first member 21. The joining portion 30 is preferably formed to have a multilayer structure in which from the first matter 21 to the second member 22, a first layer containing a first oxide of a transition metal, a second layer containing an electrically conductive oxide of a transition metal having a low valence as compared to that of the first oxide, and a mixed layer containing a transition metal and an oxide thereof are formed.

16 Claims, 10 Drawing Sheets

JOINED BODY

BACKGROUND OF THE INVENTION

1. Field of the Invention

The present invention relates to a joined body.

2. Description of the Related Art

Hitherto, as a joined body, a joined body in which a pair of electrodes each famed of a metal layer are provided on a surface of a honeycomb body formed of a porous ceramic has teen proposed (for example, see Patent Literature 1). According to this joined body, the metal layer contains Cr and/or Fe, a diffusion layer formed of a metal silicide is present at a boundary portion with the honeycomb body, and the reliability of the electrical connection is ensured in a high-temperature environment. In addition, as the joined body, a joined body has been proposed in which pores of a porous ceramic are filled with a ceramic, and a metal component is joined to the porous ceramic with an active metal containing solder material interposed therebetween (for example, see Patent Literature 2). In this joined body, the porous ceramic and the metal component are joined to each other using an Ag—Cu eutectic crystal. In addition, as the joined body, a joined body in which a ceramic member formed of a silicon nitride sintered, body and a metal member are joined to each other with a buffer layer interposed therebetween has been proposed (for example, see Patent Literature 3). In this joined body, there is provided a buffer layer in which a silicon nitride sintered body layer containing 5 to 20 percent by mass of a nitride of an active metal, a low-Young's modulus metal layer formed of a transition metal and an alloy thereof, and a silicon nitride sintered body layer containing 25 to 70 percent by mass of a nitride of an active metal are sequentially arranged.

CITATION LIST

Patent Literature

PTL 1: JP 2011-246340 A.
PTL 2: JP 2001-220252 A
PTL 3: JP 06-1670 A

SUMMARY OF THE INVENTION

Incidentally, as a member to be joined, for example, a SiC porous body containing Si may be mentioned. When a ceramic containing a Si metal as described above is joined by a joining portion, since a reactivity between a metal functioning as a joining material and the Si component is high, for example, a predetermined reaction layer is formed, so that the joining properties may be disadvantageously influenced in some cases. In addition, although the joined body may be required to have a heat resistance in some cases, when the joined body is exposed to a high temperature in the air during the use thereof, for example, the reaction layer described above may grow, and as a result, a problem of degradation of mechanical and electrical joining properties arises.

The present invention was made in consideration of the problem described above, and a primary object of the present invention is to provide a joined body which can further enhance the reliability when a member containing si is joined.

Through intensive research carried out to achieve the primary object described above, the present inventors found that if an oxide containing a $Fe_3O_4$ phase is used as a joining portion, the reliability can be further improved when a matter containing Si is joined, and as a result, the present invention was made.

That is, a joined body of the present invention comprises:
a first member which is a ceramic containing Si;
a second member; and
a joining portion which includes an electrically conductive oxide containing a $Fe_3O_4$ phase and which joins the first matter and the second member.

In the joined body of the present invention, the first roaster which is a ceramic containing Si is joined to the second matter by the joining portion which includes an electrically conductive oxide containing a $Fe_3O_4$ phase. Accordingly, when the first member containing Si is joined, a reaction layer is further suppressed from being formed at a joining interface between the first member and the joining portion, and hence, the reliability is further enhanced. The reason for this is inferred that, for example, a $Fe_3O_4$ phase has a low reactivity with a member containing Si.

DESCRIPTION OF THE PREFERRED EMBODIMENTS

Figure 1:
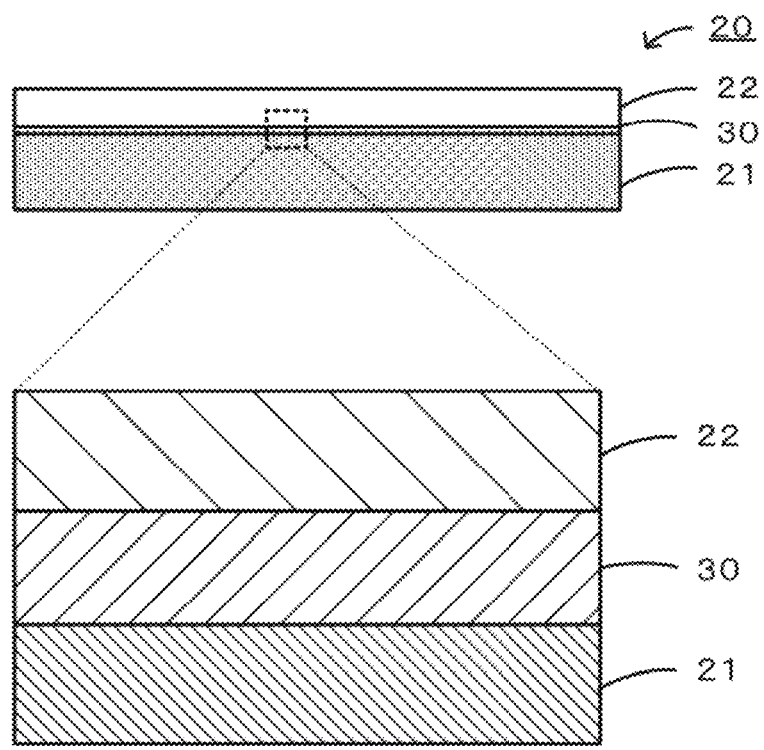
FIG. 1 is an explanatory view schematically showing one example of the structure of a joined body 20.
Figure 2:
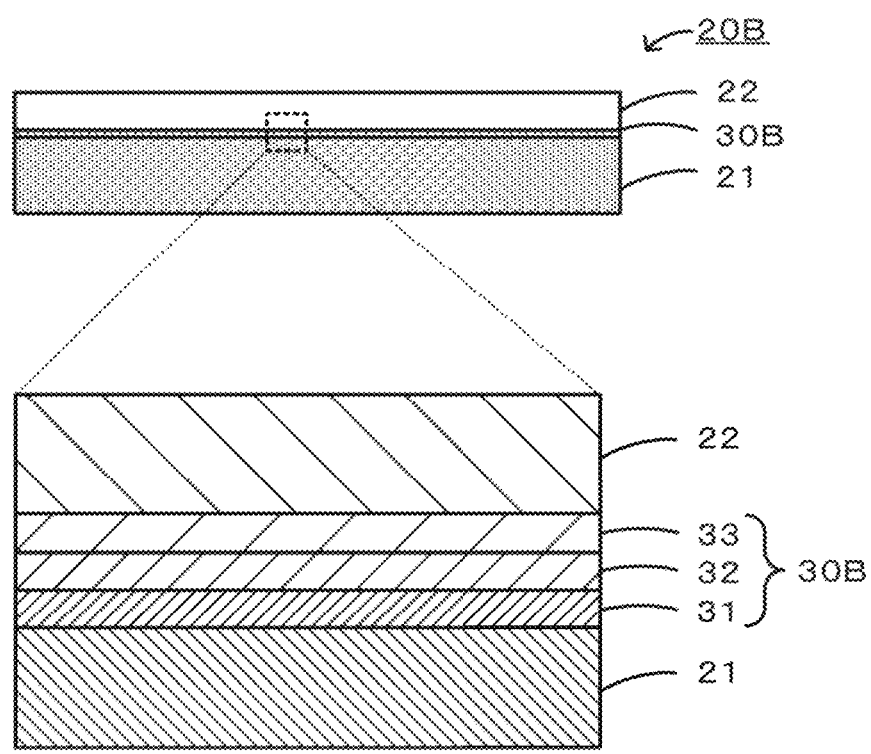
FIG. 2 is an explanatory view schematically showing one example of the structure of a joined body 20B.
Figure 3:
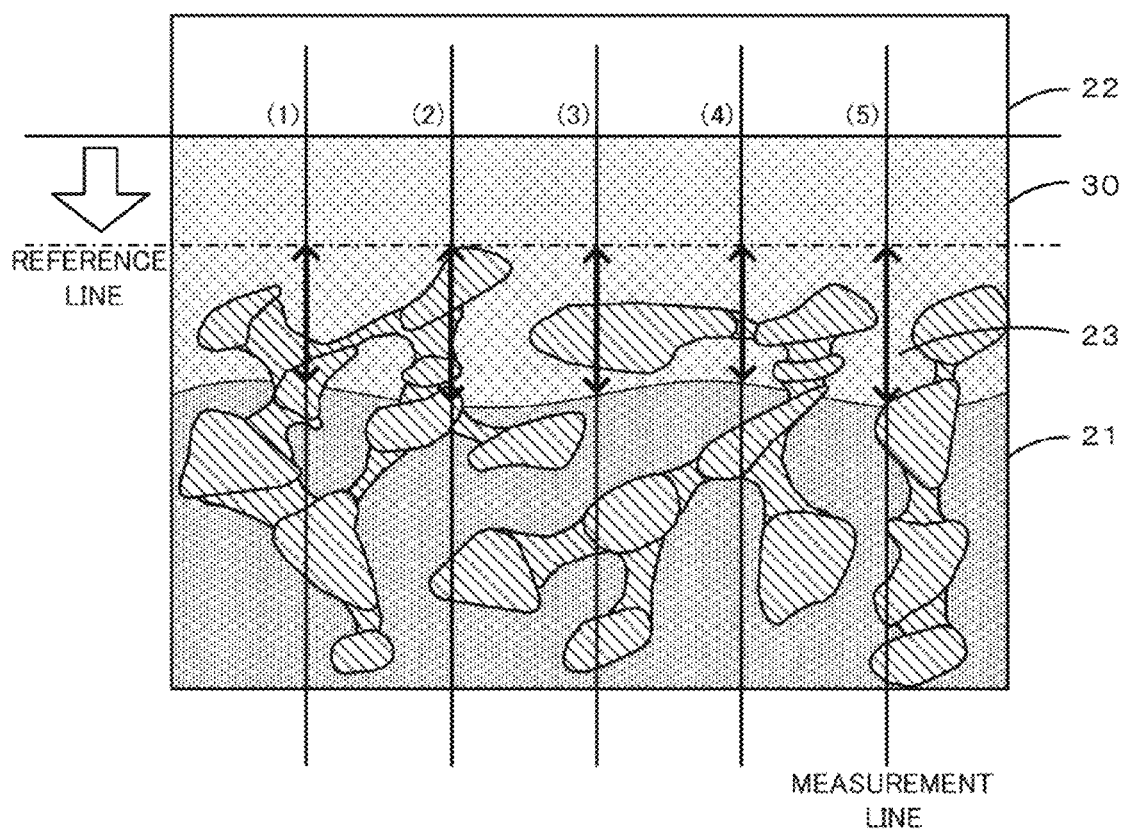
FIG. 3 is an explanatory view illustrating an intrusion depth into a porous ceramic of a joining portion 30.
Figure 4:
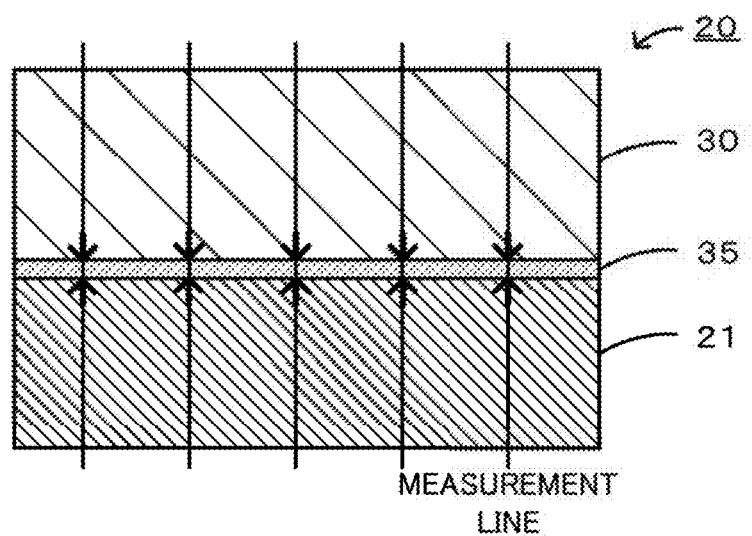
FIG. 4 is an explanatory view for obtaining the thickness of a reaction layer.
Figure 5:
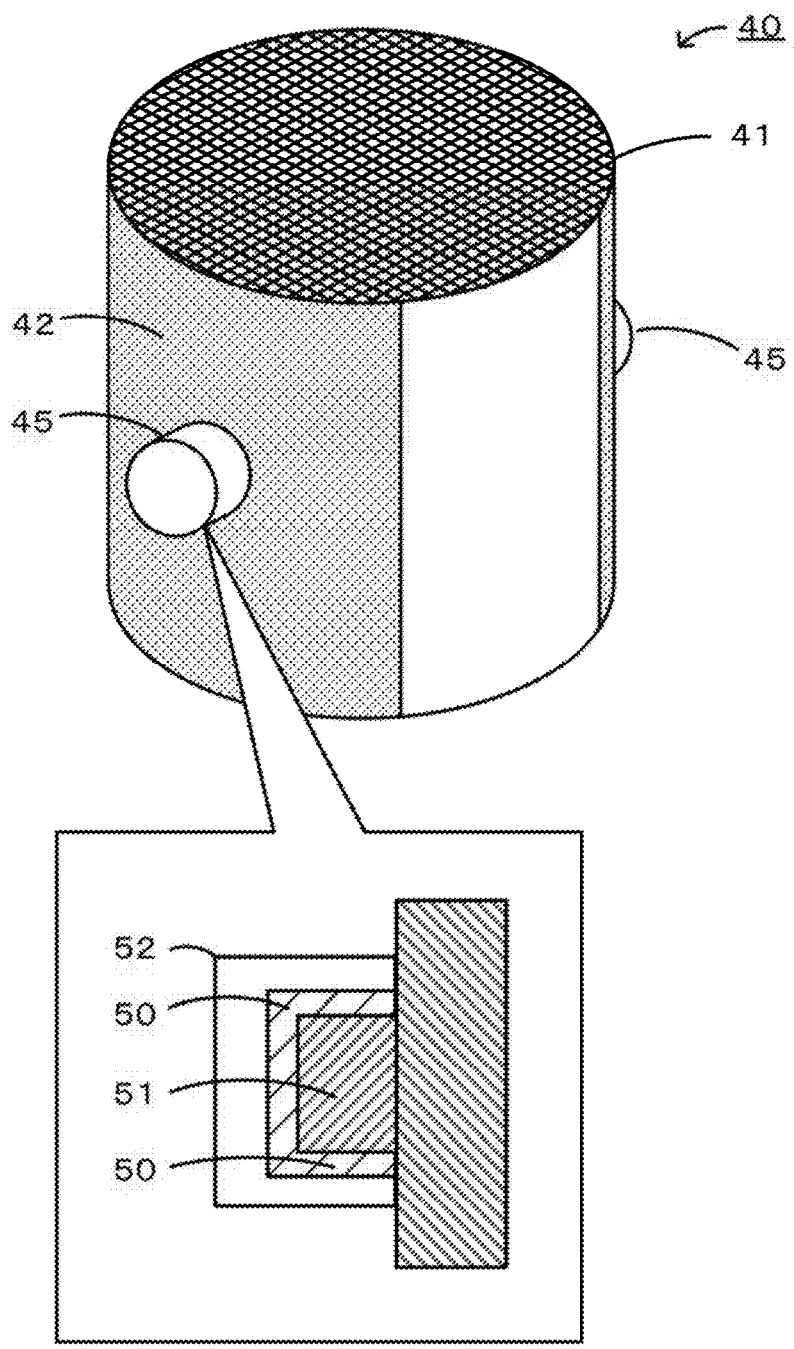
FIG. 5 is an explanatory view of a honeycomb structural body 40 which is one example of the joined, body 20.
Figure 6:
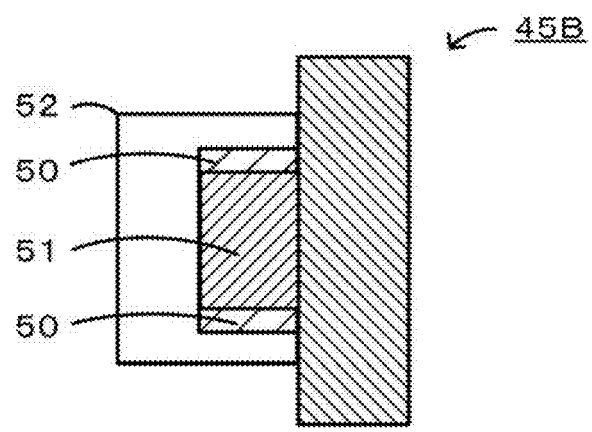
FIG. 6 is an explanatory view of an electrode, portion 45B.

Next, modes for carrying out the present invention will be described with reference to the drawings. FIG. 1 is an explanatory view schematically showing one example of the structure of a joined body 20 according to one embodiment of the present invention. FIG. 2 an explanatory view schematically showing one example of the structure of a joined body 20B. FIG. 3 is an explanatory view illustrating an intrusion depth into a porous ceramic of a joining portion 30. FIG. 4 is an explanatory view for obtaining the thickness of a reaction layer. FIG. 5 is an explanatory view of a honeycomb structural body 40 which is one example of the joined body 20. FIG. 6 an explanatory view of an electrode portion 45B.

As shown in FIG. 1, the joined body 20 of the present invention includes a first member 21 which is a ceramic containing Si, a second member 22, and a joining portion 30 which is formed of an electrically conductive oxide containing a $Fe_3O_4$ phase and which, joins the first member 21 and the second member 22. Alternatively, as shown in FIG. 2, the joined body 20B may be formed such that the second member 22 has a coefficient of thermal expansion (CTE, ppm/K) higher than that of the first member 21, and a joining portion 30B is formed to have a multilayer structure in which from the first member 21 to the second member 22, a first layer 31 containing a $Fe_2O_3$ phase as a first oxide, a second layer 32 containing a $Fe_3O_4$ phase as a second oxide having a lower Fe valence than that of the first oxide, and a mixed layer 33 containing a Fe metal and the second oxide are formed.

The first member 21 which is an object to be joined is a ceramic containing Si and nay be either a porous ceramic or a dense ceramic. In addition, although the first member 21 may be either a member having electrically conductive properties or a member having no electrically conductive properties, a member having electrically conductive properties is preferable. The ceramic of this first member 21 contains metal Si. As the first member 21, although the material is not particularly limited as long as containing metal Si, for example, a Si-bonded SiC porous body in which SiC is boned with metal Si and a Si-impregnated sic sintered body in which metal Si is impregnated into pores of porous SiC may foe mentioned. Incidentally, the term "having electrically conductive properties" indicates the case in which the electrical conductivity is $10^{-6}$ S/cm or more, and the term "having no electrically conductive properties" indicates the case in which the electrical conductivity is less than $10^{-6}$ S/cm.

The porous ceramic is not particularly limited as long as having a porous property. As a ceramic having a porous property, a ceramic at least having open pores in its surface may be mentioned. For example, although a ceramic having a porosity of 10 percent by volume or more may be used, the porosity is preferably 20 percent by volume or more and more preferably 40 percent by volume or more. In addition, in view of easy formation, the porosity is preferably 90 percent by volume or less. The porosity of the porous ceramic my be appropriately selected in accordance with the application. The average pore diameter of this porous ceramic is preferably, for example, in a range of 1 to 300 μm. When the average pore diameter is in the range described above, an oxide ceramic is likely to intrude into pores of the porous ceramic and may be more tightly joined thereto. This average pore diameter is more preferably 5 μm or more and further preferably 10 μm or more. In addition, this average pore diameter is more preferably 100 μm or less and further preferably 50 μm or less. Although the shape of the porous ceramic is not particularly limited and may be selected in accordance with the application, for example, a plate, a cylindrical, and a honeycomb shape may be mentioned, and the structure through which a fluid is allowed to pass may also be selected. In particular, this porous ceramic may be a honhoneycomb structural body having a partition portion which forms a plurality of cells each functioning as a flow path of a fluid. In addition, the porosity and the average pore diameter of the porous ceramic described above each indicate the measurement result obtained by a mercury intrusion method.

The joining portion 30 may be a portion which intrudes into pores 23 of the porous ceramic and joins this porous ceramic to another member. A depth (intrusion depth) of intrusion of this oxide ceramic into the pores of the porous ceramic is preferably 10 μm or more. The reason for this is that the joining strength can be farther increased. This intrusion depth is more preferably 15 μm or more and further preferably 20 μm or more. In addition, this intrusion depth is preferably in a range of 50 μm or less. A measurement method of this intrusion depth will, be described. As shown in FIG. 3, a cross-section in which the first member 21 of the porous ceramic, the second member 22, and the joining portion 30 (oxide ceramic) can be simultaneously observed is mirror-polished. This polished surface is observed using a scanning electron microscope (SEM) at a magnification of 200 times, and a microstructure picture is taken thereby. Next, in the image thus taken, a line in parallel to the line at the bottom end of the second member 22 is drawn so as to be in contact with the topmost portion of the porous ceramic. This line thus drawn is regarded as a reference line (a chain line in FIG. 3), and the intrusion depth at this line is set to 0. Next, the reference line is equally divided into six segments, and five linear lines orthogonal to the reference line are drawn and are used as measurement lines (lines (1) to (5) in FIG. 3). The intersection between the reference line and each measurement line is regarded as a starting point, the intersection between the measurement line and the bottom end of the oxide ceramic is regarded as an end point, and the length therebetween is measured for each of the five measurement lines. The length of each of the five lines in consideration of the magnification used in the picture taking is obtained, and the average value calculated therefrom is regarded as the intrusion depth.

The second member 22 which is an object to be joined may be formed of the same material as or a different material from that of the first mentor 21. The second member 22 may foe either a porous ceramic or a dense material. In addition, the second member 22 may or nay not have electrically conductive properties. Since a transition metal and an oxide thereof each have relatively high electrically conductive properties, it is preferable that the first member 21 and the second member 22 each have electrically conductive properties and that the joined body 20 has electrically conductive properties.

The porous ceramic may be formed so as to contain at least one inorganic material selected, for example, from a carbide, such as silicon carbide, titanium carbide, zirconium carbide, or a boron carbide; a nitride, such as silicon nitride, aluminum nitride, titanium nitride, or zirconium nitride; an oxynitride such as sialon; a silicide such as molybdenum silicide; and zirconium phosphate. In addition, the porous ceramic may be formed so as to contain at least one inorganic material selected, for example, from cordierite, mullite, zeolite, aluminum titanate, aluminum oxide, zirconium oxide, titanium oxide, silicon oxide, and magnesium oxide. Although the shape of the porous ceramic is not particularly limited and may be selected in accordance with the application, for example, a plate, a cylindrical, and a honeycomb shape may be mentioned, and the structure through which a fluid is allowed to pass may also foe selected. In particular, this porous ceramic may be a honeycomb structural body having a partition portion which forms a plurality of cells each functioning as a flew path of a fluid.

Any dense member having a low porosity may foe used as the dense material, and for example, either a metal member or a dense ceramic may be used. The dense material may be a material having a porosity of 5 percent by volume or less, and the porosity is preferably 1 percent by volume or less and more preferably 0.5 percent by volume or less. Although the metal member is not particularly limited as long as being formed of a metal, such as a typical metal or a transition metal, a metal member having high electrically conductive properties is preferable. As the transition metal, a metal, such as Fe, Co, Ni, or Cu, and an alloy thereof are preferable. In addition, in accordance with the application, a noble metal, such as Pt or Au, may also be used. This metal member may be used as an electrode, and in this case, for example, stainless steel, such as a Cr—Ni—Fe-based alloy (SUS304) or a Cr—Fe-based alloy (SUS430), is preferably used. This metal member is preferably an alloy containing at least Fe and Cr, and an alloy at least containing 70 to less than 90 percent by mass of Fe and 10 to less than 30 percent by mass of Cr is more preferable. The reasons for this are that the material quality is stable, and the electrically conductive properties are excellent. The shape of the metal member may be appropriately selected from a plate or the like in accordance with the application. As the dense ceramic, for example, a ceramic obtained by densely sintering any one of the materials mentioned above as the porous ceramic, a member formed by filling a filler or an impregnant in the pores of the above porous ceramic, or a composite oxide member containing at least two types of metals may be mentioned. As the member formed by filling, in particular, for example, a Si-impregnated SiC sintered body in which pores of porous SiC are impregnated with metal Si may be mentioned. This material has good thermally conductive properties and also has high electrically conductive properties due to the presence of the metal Si. In addition, as the composite oxide member, for example, an electrically conductive ceramic material, such as a $LaCrO_3$-based material, a $BaTiO_3$-based material, a $LaMnO_3$-based material, a $LaCoO_3$-based material, a $NaCo_2O_4$-based material, a $Ca_3Co_4O_9$-based material, a $LaNiO_3$-based material, or a $SrTiO_2$-based material, may foe mentioned. In addition, the term "-based material" is meant to include a material which is partially substituted by an alkali metal element, an alkaline earth metal element, and/or an element having a different valence. In particular, in the $LaMnO_3$-based material, for example, $(La_{0.9}Sr_{0.1})MnO_3$ may be mentioned.

The difference in coefficient of thermal expansion between the first member 21 and the second member 22 may be set to 4.0 ppm/K or more. Even in a joined body formed by joining members having a relatively large difference in coefficient of thermal expansion, by joining portion formed of an electrically conductive oxide, the joining strength and the electrically conductive properties can be maintained. In particular, even in a joined body which is to be repeatedly used by heating, the joining strength and the electrically conductive properties can be maintained. The difference in coefficient of thermal expansion may be set to 6.0 ppm/K or more and may also be set to 15 ppm/K or less. For example, as for the coefficient of thermal expansion, a Cr—Ni—Fe-based alloy (SUS304) has 18 ppm/K, a Cr—Fe-based alloy (SUS430) has 12 ppm/K, a Si-bonded SiC sintered body has 4.6 ppm/K, a porous $Al_2O_3$ body has 7.0 ppm/K, and $LaCrO_3$ has 9.4 ppm/K.

The joining portion 30 of the present invention includes an electrically conductive oxide containing a $Fe_2O_4$ phase. The electrically conductive oxide preferably contains Fe as a primary component. In addition, the electrically conductive oxide is preferably a $Fe_3O_4$ phase. This joining portion 30 may further contain a $Fe_3O_4$ phase. A smaller content of this $Fe_3O_4$ phase is more preferable in view of the electrically conductive properties.

This electrically conductive oxide may further contain, in addition to the $Fe_3O_4$ phase as a primary component, at least one additive selected from Ni, Mn, Co, Cu, and Zn. In addition, this additive, is preferably solid-dissolved in the electrically conductive oxide. Accordingly, the joining portion can be made more thermally stable. In particular, since the primary component is Fe, it is preferable that a component, such as Mn, Co, Ni, Cu, or Zn, is able to form a spinel structure and is easily solid-dissolved in $Fe_3O_4$. Among those mentioned above, as the additive, Ni is preferable. In the Fe oxide of the joining portion 30, the additive is solid-dissolved preferably in a range of 2 to 20 percent by mass and more preferably in a range of 2 to 15 percent by mass. The range described above is preferable since a high joining strength can be obtained, and the heat resistance is also high.

The electrically conductive oxide included in the joining portion 30 may contain a $Fe_3O_4$ phase in which Ni is solid-dissolved and may have a peak shift of 0.02° or more of the (751) plane of $Fe_3O_4$ by x-ray diffraction using the CuKα line. Accordingly, the oxide ceramic can be made more thermally stable. This peak shift, is more preferably 0.05° or more and may also be set to 0.1° or more. In addition, the electrically conductive oxide included in the joining portion 30 may contain a $Fe_2O_3$ phase in which Ni is solid-dissolved and may have a peak shift of 0.02° or more of the (410) plane of $Fe_2O_3$ by x-ray diffraction using the CuKα line. Accordingly, the oxide ceramic can be made further thermally stable. This peak shift is more preferably 0.04° or more and may also be set to 0.05° or more. In addition, the electrically conductive oxide containing Fe may not contain a crystal phase of $Fe_2MO_4$ (where M represents an additive). Since this $Fe_2MO_4$ has low electrically conductive properties, when a joined body having electrically conductive properties is to be formed, the presence of this crystal phase is not preferable.

In the joining portion of the present invention, a reaction layer having the thickness of greater than 3.0 µm is preferably not formed at a joining interface between the joining portion 30 and the first member. The reason for this is that when the reaction layer is formed, the mechanical and electrical joining properties are disadvantageous degraded. Although no reaction layer is most preferably formed, the reaction layer may be formed to have a thickness of 3.0 µm or less, and the thickness thereof is more preferably 1.0 µm or less and further preferably 0.1 Jim or less. A method to obtain the thickness of this reaction layer will be described. FIG. 4 is an explanatory view for obtaining the thickness of a reaction layer 35. The thickness of the reaction layer 35 generated at the interface between, the first member 21 and the joining portion 30 is measured using an image obtained by observation with a scanning electron microscope (SEM). In particular, the cross-section of the joined body 20 is observed at a magnification of 3,000 times using SEM-EDX. Next, after lines (measurement lines) orthogonal to the interface are drawn so as to equally divide the interface of this image into five segments, the lengths each obtained from the intersection of the measurement line with the lower limit of the reaction layer 35 generated at the interface to the intersection of the measurement line with the upper limit thereof are measured, and the average calculated from the lengths measured at the five positions is regarded as the thickness of the reaction layer.

As shown in FIG. 2, the joining portion 30B of the present invention may be configured to include at least a mixed layer 33 containing a Fe metal and a Fe metal oxide. In this case, the joining portion 30B may be configured to have a multilayer structure in which from the first member 21 to the second member 22, a first layer 31 containing a first oxide, a second layer 32 containing a second oxide which has a lower Fe valence than that of the first oxide, and the mixed layer 33 containing a Fe metal and the second oxide are formed. Accordingly, it is preferable since the durability can be further improved. The multilayer structure described above may also be called a gradient layer. In addition, the joining portion 30B may be configured to have the first layer 31 and the mixed layer 33 or may be configured to have the second layer 32 and the mixed layer 33. In this case, in the joining portion 30B, with respect to the total thickness of this joining portion 30B, the thickness of the mixed layer 33 is preferably in a range of 10% to 85%, more preferably 30% or more, and further preferably 40% or more. In addition, in the joining portion 30B, with respect to the total thickness of this joining portion 30B, the thickness of the second layer 32 is preferably in a range of 9% to 70%, more preferably in a range of 10% to 60%, and further preferably in a range of 20% to 50%. In addition, in the joining portion 30B, with respect to the total thickness of this joining portion 30B, the thickness of the first layer 31 is preferably in a range of 1.5% to 15%, more preferably in a range of 2.0% to 12%, and further preferably in a range of 2.5% to 10%. For example, in the case in which the first member 21 is a ceramic containing metal Si, and the second member 22 is a metal member, it is preferable since the affinity between the first member 21 and the first oxide is high, and the affinity between the second member 22 and the mixed layer 33 containing a metal is also high. In addition, it is also preferable since the valence of the transition metal is gradually decreased from the first member 21 to the second member 22.

In the joining portion 30, an oxide of the above additive may co-exist. For example, when the primary component of the joining portion 30 is a $(Fe,Ni)_3O_4$ phase in which Ni is solid-dissolved, NiO, which is an oxide of the solid solution component, may also toe present in the form of a crystal phase, and when the primary component of the joining portion 30 is a $(Fe,Mn)_3O_4$ phase in which Mn is solid-dissolved, an oxide, such as MnO, $MnO_2$, $Mn_2O_3$, or $Mn_3O_4$, may also co-exist. In addition, in the joining portion 30, a Fe metal may also remain.

In addition, in the joined, body formed by joining the first member 21 and the second member 22, each having electrically conductive properties, the electrical conductivity of the joining portion 30 is preferably $1 \times 10^{-5}$ (S/cm) or more, more preferably $1 \times 10^{-2}$ (S/cm) or more, and further preferably 1 (S/cm) or more. As the electrical conductivity is higher, the electrically conductive properties are improved, and the electricity can foe efficiently used as the joined, body; however, in consideration of materials to be used in combination, the upper limit may be approximately $10^3$ (S/cm). The electrical conductivity may be obtained as described below. After a hole is formed in a part of the joining portion of the joined body, an Ag electrode is baked on an exposed joining material, and the electrical resistance is measured by bringing a measurement needle into (contact therewith. After the resistance thus measured is converted into the volume resistivity using the electrode area, and the distance between terminals, the reciprocal of the volume resistivity is then obtained as the electrical conductivity.

In the joined body of the present invention, the joining strength between the first member and the second member is preferably 2.0 MPa or more and more preferably 3.5 MPa or more. The joining strength is measured by a four-point bending test (JIS-R1632). In addition, this joining strength is more preferably 5.0 MPa or more and further preferably 10 MPa or more. As the joining strength is increased, a stronger joining is obtained, and the reliability is preferably enhanced; however, in consideration of materials to be used in combination, the upper limit may be approximately 500 MPa.

The joined, body 20 is not particularly limited as long as having the structure in which the first member 21 and the second member 22 are joined to each other, and for example, the joined body may be used, for example, for a honeycomb structural body, a thermoelectric element, a ceramic heater, or a gas detecting sensor for oxygen, $NO_x$, or the like. For example, in the case of the honeycomb structural body, the joined body may be preferably used as a device or the like which heats the honeycomb structural body by applying the voltage to metal members. The first member may be a part of a honeycomb structural body including: a partition wall formed, of a porous ceramic which forms and defines a plurality of cells, the cells each functioning as a flow path of a fluid and extending from one end surface to the other end surface; and an outer circumference wall formed along the outermost circumference. In addition, the second member may be a metal member. As shown in FIG. 5, a honeycomb structural body 40 is configured, to heat a honeycomb substrate 41 by applying the voltage between electrode portions 45. This honeycomb structural body 40 includes the honeycomb substrate 41, a high electrically conductive portion 42 having high electrically conductive properties as compared to those of the honeycomb substrate 41, and the electrode portions 45 connected to the high electrically conductive portion 42. The electrode portion 45 an electrode terminal protrusion portion 51 connected to the high electrically conductive portion 42, a metal terminal portion 52 which is a metal member, and a joining portion 50 electrically and mechanically connecting the electrode terminal protrusion portion 51 the metal terminal portion 52. This joining portion 50 contains an electrically conductive oxide as is the joining portion 30. In this electrode portion 45, the first member 21 is the electrode terminal protrusion portion 51 formed to have a convex shape or a concave shape, the second member 22 is the metal terminal portion 52 which is formed so that a portion to be joined to the electrode terminal protrusion portion 51 has a concave shape or a convex shape complementary to the shape of the electrode terminal protrusion portion 51, and the joining portion 50 electrically connects the electrode terminal protrusion portion 51 and the metal terminal portion 52 at a portion between the concave shape and the convex shape at which the electrode terminal protrusion portion 51 and the metal terminal portion 52 are engaged with each other. In this case, as shown by an electrode portion. 45B of FIG. 6, the electrode terminal protrusion portion 51 and the metal terminal portion 52 may form no space between a protruding front end of the convex shape and a bottom part of the concave shape, those shapes being complementary to each other, and the joining portion 50 may electrically connect the electrode terminal protrusion portion 51 and the metal terminal portion 52 at side surface portions of the concave shape and the convex shape at which the electrode terminal protrusion portion 51 and the metal terminal portion 52 are engaged with each other. For example, when the honeycomb structural body is formed of a Si-bonded SiC ceramic, the high electrically conductive portion 42 may have a higher metal Si content.

Next, a method for manufacturing a joined body of the present invention will be described. The method for manufacturing a joined body of the present invention may include a joining step of, for example, forming a laminate in which a joining layer containing a Fe metal powder is formed between a first member which is a ceramic containing Si and a second member, and forming a joining portion which joins the first member and the second member using an electrically conductive oxide formed by firing this laminate in a temperature range lower than the melting point of an Fe oxide.

(Joining Step)

As a transition metal used for the joining portion, for example, Fe, Mn, Co, Ni, and Cu may be mentioned. Among those mentioned above, Fe is preferably used. As a raw material of the joining portion, a transition metal powder is preferably used. In addition, when Fe is used as the transition metal, to the raw material used for the joining portion, a powder containing an additive capable of forming a spinel structure is more preferably added. Accordingly, since the additive is solid-dissolved in the Fe oxide, the thermal stability can foe further enhanced. As the additive, at least one of Ni, Mn, Co, Cu, and Zn may be mentioned. The additive may be, for example, either a metal powder or an oxide powder. In addition, as the raw material of the transition metal, a transition metal oxide is not appropriate as the raw material of the joining portion since the joining between the first member and the second member is not sufficiently formed even by a heat treatment. The addition amount of the additive is, as a blending rate to the entire joining portion, preferably 2 percent by mass or more, more preferably 2.5 percent by mass or more, and further preferably 3 percent by mass or more. The addition amount of this additive is, as a blending rate to the entire joining portion, preferably 20 percent by mass or less, more preferably 15 percent by mass or less, and further preferably 10 percent by mass or less.

As this raw material powder, for example, a powder having an average particle diameter in a range of 1 to 40 μm is preferably used. In the range described above, an appropriate joining strength is likely to be obtained. The average particle, diameter of the raw material of this joining portion is preferably 30 μm or less, more preferably 10 μm or less, and further preferably 5 μm or less. In addition, this average particle diameter is more preferably 3 μm or more. In this step, at least two raw material, powders having different particle sizes are preferably mixed together to form a raw material powder of the joining portion. Accordingly, the joining strength at the joining portion can be further increased. The Fe metal powder may foe prepared by mixing a first powder having a predetermined average particle diameter (μm) and a second powder having an average particle diameter (μm) larger than the predetermined average particle diameter. The second powder is preferably used in order to improve the strength of the joining portion itself. The average particle diameter of the first powder may be set in a range of 0.1 to 10 (μm), and the average particle diameter of the second powder may be set in a range of 10 to 100 (μm). In addition, the average particle diameter of this raw material powder indicates the median diameter (D50) measured by a laser diffraction/scattering particle size distribution measurement apparatus using water as a dispersion medium.

In the joining step, the laminate may be fired in the air or may be fired in the air after a heat treatment is performed in a non-oxidizing atmosphere. As the non-oxidizing atmosphere, for example, a nitrogen atmosphere or a rare gas atmosphere (Ar or He) may be mentioned. A joining temperature (firing temperature) may be appropriately selected as long as being in a lower temperature range than the melting point of the Fe oxide and is preferably 400° C. to 900° C. In this temperature range, at least a part of the metal powder of the joining portion can be oxidized. Although this joining temperature is set in an appropriate range in accordance with the material of the joining portion, the joining temperature is more preferably 500° C. or more and further preferably 600° C. or more. In addition, the joining temperature is more preferably 850° C. or less and further preferably 800° C. or less. This joining temperature is preferably higher in view of sufficient oxidation and is preferably lower in view of energy consumption. As described above, a joining treatment can be performed in a simple atmosphere, such as in the air, and at a low temperature, such as 900° C. or less. In addition, in this step, the firing is preferably performed so that the porosity of the joining portion 30 is 60 percent by volume or less, and the porosity is more preferably 50 percent by volume or less and further preferably 30 percent by volume or less. The joining portion 30 is more preferably a dense body in view of the joining strength. In addition, in this step, the firing is preferably performed, so that the porosity of the joining portion 30 is 5 percent by volume or more, more preferably performed so that the porosity is 10 percent by volume or more, and farther preferably performed, so that the porosity is 20 percent by volume or more. The joining portion 30 more preferably has pores in view of stress relaxation.

This step may be a step of forming a joining (portion having a gradient layer which includes a first layer containing a $Fe_2O_3$ phase as a first oxide; a second layer containing a $Fe_3O_4$ phase as a second oxide having a low Fe valence as compared to that of the first oxide; and a mixed layer containing a Fe metal and the second oxide. A method to obtain the joining portion having a gradient layer including the first layer, the second layer, and the mixed layer may be performed in such a way that for example, at least one of the thickness of the joining portion, the addition, amount of the additive, the firing temperature, the firing time, the shape of the joining portion, and the material and shape of the first member is adjusted so as to control the diffusion of oxygen to be supplied. For example, when the firing temperature is increased, since the oxygen diffusion is promoted, the first layer which is more oxidized has a large thickness, and the thickness of the second layer containing a material having a low valence and the thickness of the mixed layer are decreased. In addition, when the addition amount of the additive to be solid-dissolved in the Fe oxide is changed, the thickness of each layer can be changed. For example, when the primary component is a $Fe_3O_4$ phase, and the solid solution component is NiO, if the joining portion is formed only from Fe, since the volume expansion occurs by oxidation, a physical space in the joining portion is decreased as the temperature is increased, and the frequency of direct contact with oxygen is decreased in the joining portion, so that oxidation is not likely to occur. On the other hand, when an oxide (NiO) having a small volume change as compared to that of the primary component is added, since the physical space can be maintained even in a relatively high firing temperature range, oxidation is allowed to progress to the inside. Hence, when the addition amount of the additive is increased, the space is increased, and oxidation is likely to progress to the inside, so that the thickness of the mixed layer can be decreased. In addition, when the first member is formed, of a porous material, and oxygen is supplied only from a first member side (for example, in the case in which the side surface of the joining portion shown in FIG. 1 is sealed), since oxidation of Fe occurs from the first member side, the gradient layer described above is likely to be formed. In the case of a shape, such as the cap type electrode portion shown, in FIGS. 5 and 6, to which oxygen is supplied only from one direction as compared to a joining portion having a common plate shape, since the supply amount and the supply direction of oxygen are limited, the gradient layer is likely to foe formed. In addition, when the first member is formed of a dense material, if the raw materials are adjusted to form a multilayer structure, the gradient layer may be formed. For example, after at least two types of powders adjusted to have different mixing ratios each between a Fe metal and an oxide are prepared in advance, raw material powders are compacted so as to form a multilayer structure in which, the amount of the metal is increased from a first member (low CIS member) side to a second member (high CTE member) side, and firing is performed in an oxygen atmosphere. By the method described above, the gradient layer may also be formed. In particular, when the transition metal as the primary component is Fe, for example, a first raw material powder having $Fe/Fe_2O_3=5/95$ on the volume ratio, a second raw material powder having $Fe/Fe_2O_3=20/80$, and a third raw material powder having $Fe/Fe_3O_4=90/10$ are prepared to form a multilayer structure, and firing is then performed in the air. Accordingly, Fe is oxidized by a reaction with oxygen supplied from the substrate and the side surface and oxygen in $Fe_2O_3$, so that the gradient, layer can be formed.

In the step described, above, firing is preferably performed, while the movement of the first member 21 and the second member 22 is restricted. Accordingly, the displacement of the members can be prevented. In addition, it is believed that the first member 21 and the second member 22 can be more reliably joined to each other. Incidentally, the term "restriction of movement" may include, for example, the case in which a metal member is fixed by applying a load thereto which may be given by a holding jig or the like. Although it is possible to fix the first member 21 and the second sorter 22 by positively applying a pressure, the treatment as described above is preferably omitted in view of simplification of the manufacturing step.

The joining portion 30 of the embodiment described above can further enhance the reliability when a member containing Si is joined. The reason for this is that since this joining portion 30 can further suppress a reaction of an electrically conductive oxide ($Fe_3O_4$ phase) with metal Si, for example, a reaction layer can be suppressed from being generated at the joining interface between the first member 21 the joining portion 30. In addition, when the joining portion 30B is provided in which the first layer 31 containing a first oxide of a transition metal, the second layer 32 containing an electrically conductive oxide of a transition metal having a low valence as compared to that of the first oxide, and the mixed layer 33 containing a transition metal and an oxide thereof are formed to have a multilayer structure from the first member 21 to the second member 22, it is preferable since the durability can be further improved. In addition, when the additive is solid-dissolved in the electrically conductive oxide, it is preferable since the electrically conductive oxide (such as $Fe_3O_4$) is further thermally stabilized due to the solid solution of the additive.

In addition, the present invention is not limited at all to the embodiments described above, and of course, it is to be understood that the present invention, may be carried out in various modes without departing from the technical scope of the present invention.

EXAMPLES

Hereinafter, examples in each of which the joined body of the present invention was actually manufactured will be described as experimental examples. In addition, Experimental Examples 5 to 13 to the examples of the present invention, and Experimental Examples 1 to 4 correspond to comparative examples.

[Method for Forming Joined Body]

First, a metal powder of Fe, a Ni oxide powder used as an additive if needed, a poly(vinyl butyral) (PVB) resin as a binder, and terpineol as a solvent were mixed, together, so that a joining material paste was formed. This joining material paste was applied on a first member and a second member, which were each an object to be joined, and those members were adhered to each, other so that the paste sides were located therebetween. A sample obtained by this adhesion was left in the air at 80° C. over one night, so that terpineol was sufficiently dried. A holding jig was placed on this sample so as to prevent the displacement of the two members and was then fired (joined) in the air at 200° C. to 800° C. As a firing atmosphere, an air atmosphere or a vacuum atmosphere was used.

[Formation of First Member]

The first member which was a low CTE member was formed. As a porous ceramic, a Si-bonded SiC sintered body was formed. As a raw material of the porous ceramic of the Si-bonded SiC sintered body, a "mixed powder" was formed by mixing a. SiC powder and a metal Si powder at a volume ratio of 38:22. To the "mixed powder" described above, a hydroxypropyl methylcellulose as a binder, a starch as a pore forming agent, and a water absorptive resin were added as well as water, so that a raw material (molding raw material) for forming a porous material was obtained. The molding raw material was kneaded, so that a cylindrical molding precursor was formed. The cylindrical molding precursor thus obtained was molded by extrusion using an extruder, so that a honeycomb molded body was formed. This molded body was dried in an air atmosphere at 120° C. to form a dried body. This dried body was degreased in an air atmosphere at 450° C. and was then fired in an Ar atmosphere at 1,450° C. at normal pressure for 2 hours. From a honeycomb porous ceramic obtained as described above, a rectangular parallelepiped, sample having a size of 10×20×55 mm was obtained by cutting, so that a substrate (porous ceramic) was obtained. This substrate had a porosity of 40 percent by volume measured by a mercury intrusion method using a mercury porosimeter (Autopore IV9520, manufactured by Micromeritics Corp.) and an average pore diameter of 10 measured by a method similar to that described above.

[Second Member]

As the second member which was a high CTE member, a stainless steel material (SUS) was prepared. As the stainless steel material, a Cr—Fe-based alloy (SUS430) was used. This metal member was cut into a bar having a size of 3×4×20 mm, and this cut sample was used for experiments. In addition, the metal member had a porosity of 0.1 percent by volume or less measured by a mercury intrusion method using a mercury porosimeter.

Experimental Examples 1 to 13

In Experimental Examples 1 to 13, the formation was performed under conditions shown in Table 1. In Experimental Examples 1 to 4, as the joining material, a Ni solder, a Ag solder, a Cu—Mn solder, and a FeNi alloy were used, respectively, each of which was not an electrically conductive oxide. A joining portion containing an electrically conductive oxide of Fe was used in Experimental Examples 5 to 10. In Experimental Examples 11 to 13, the thicknesses of a first layer, a second layer, and a mixed layer were changed by adjusting the firing conditions.

(Identification of Crystal Phase)

Figure 8:
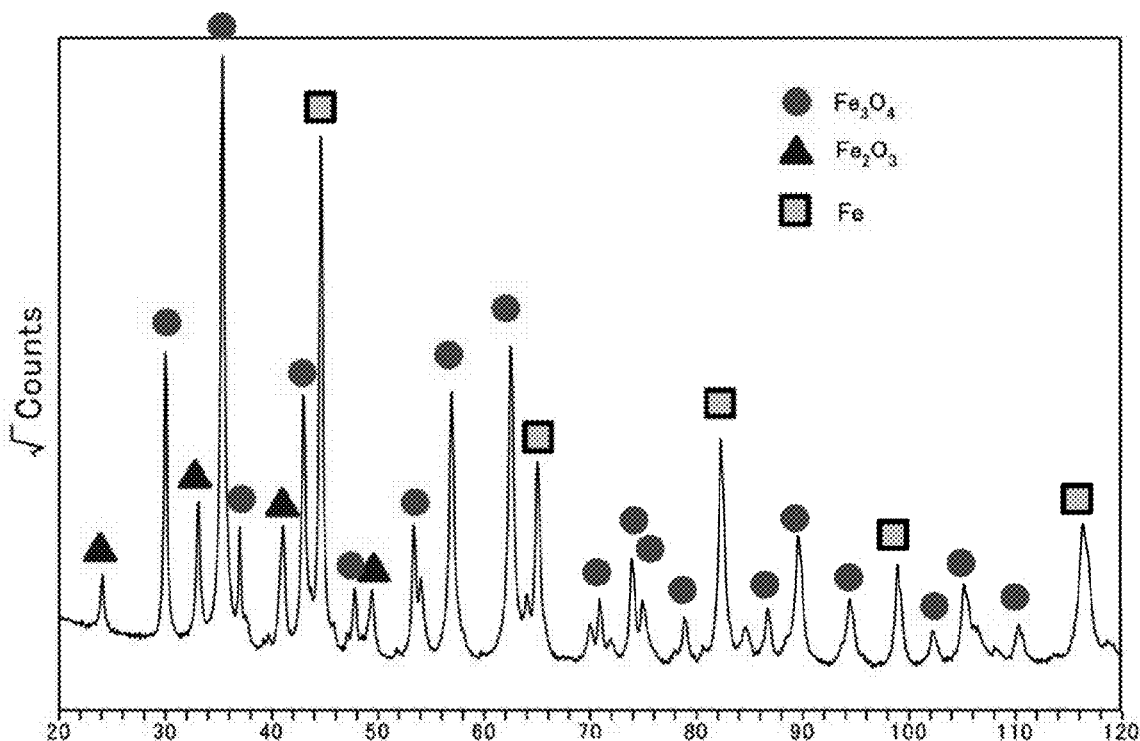
FIG. 8 is the measurement results of the x-ray diffraction of the mixed layer of Experimental Example 11.
Figure 9:
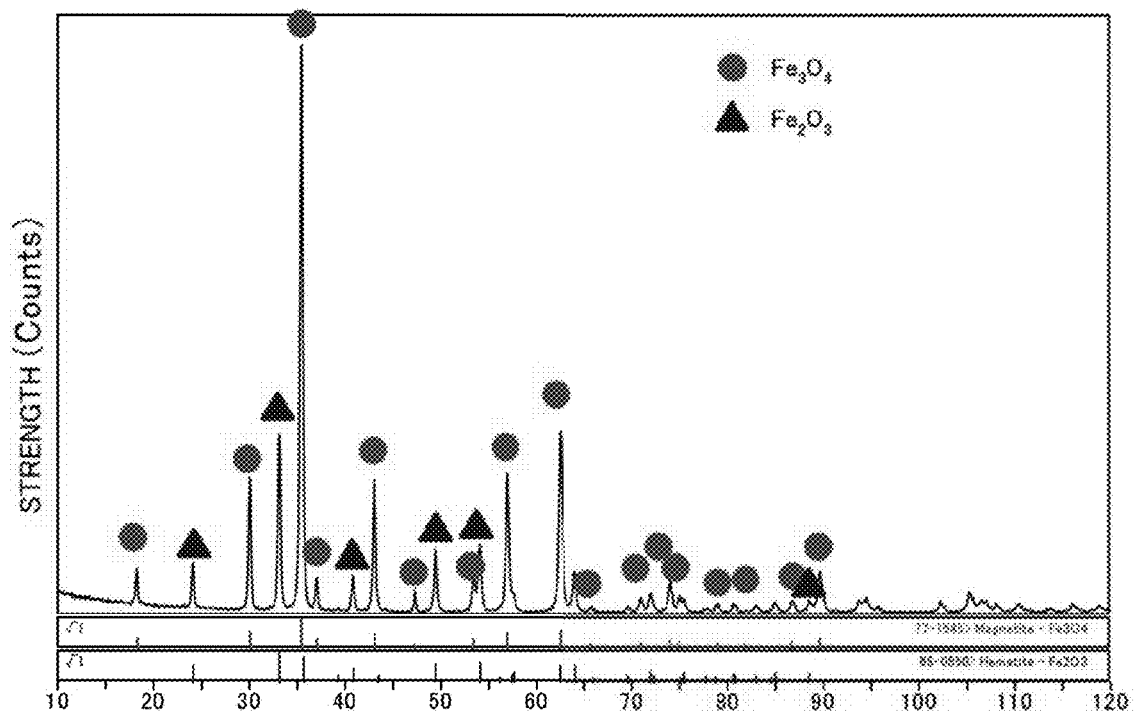
FIG. 9 is the measurement results of the x-ray diffraction of the second layer of Experimental Example 11.
Figure 10:
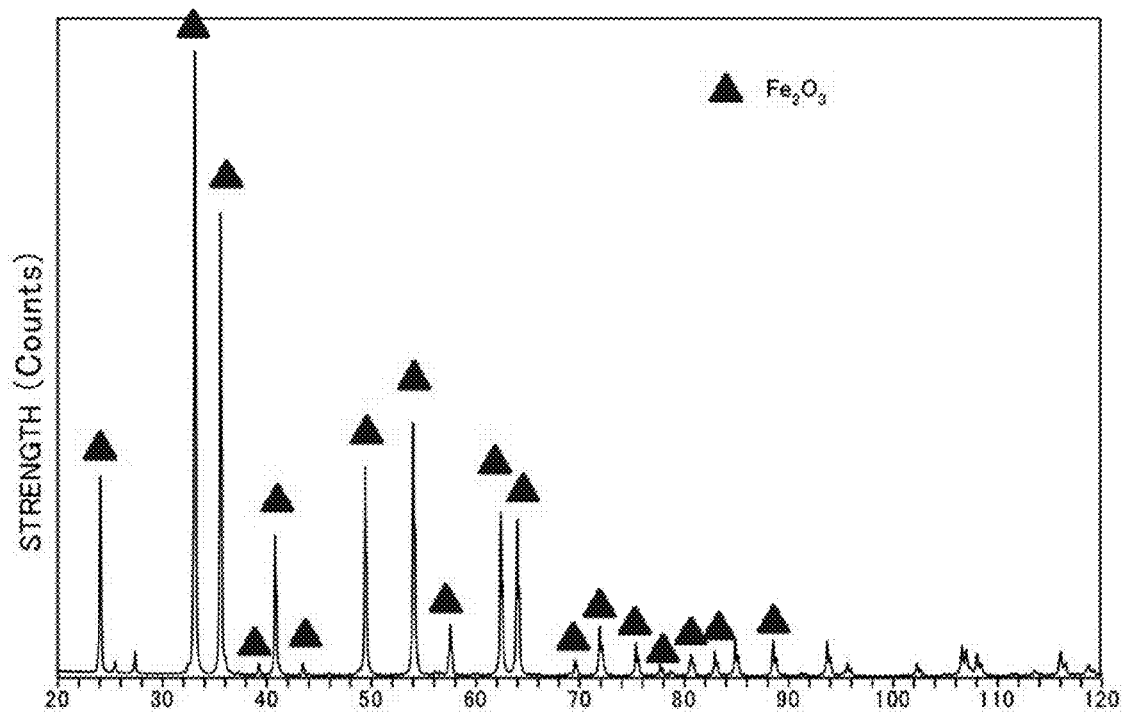
FIG. 10 is the measurement results of the x-ray diffraction of the first layer of Experimental Example 11.

By the use of a rotating anticathode-type x-ray diffraction apparatus (RINT, manufactured by Rigaku Corp.), an x-ray diffraction pattern of the joining portion was obtained. The x-ray diffraction measurement was performed using a CuKα line source at 50 kV, 300 mA, and 2θ=40° to 120°. The measurement was performed using a powder mixed with Si as the internal reference. In Experimental Examples 10 to 13, a measurement sample was cut along a flat plane including a first layer (layer containing a $Fe_3O_4$ phase), a second layer (layer containing a $Fe_3O_4$ phase), and a mixed layer (layer containing metal Fe and a $Fe_3O_4$ phase), and the plane thus cut was measured by x-ray diffraction. In the x-ray diffraction measurement, when NiO was added as the additive, a peak shift amount of the measurement sample was calculated using the peak of the (220) plane of Si as the reference peak, and was used as an index indicating the degree of solid solution of a foreign element. As for $Fe_2O_3$, a peak shift amount of 0.02° or more was obtained at the peak of the (410) plane, and as for $Fe_3O_4$, a peak shift amount of 0.02° or more was obtained at the peak of the (751) plane. That is, a Ni oxide was solid-dissolved in the Fe oxide. FIG. 8 shows the measurement results of the x-ray diffraction of the mixed layer (layer containing metal Fe and a $Fe_3O_4$ phase) of Experimental Example 11. FIG. 9 shows the measurement results of the x-ray diffraction of the second layer (layer containing a $Fe_3O_4$ phase) of Experimental Example 11. FIG. 10 the measurement results of the x-ray diffraction of the first layer (layer containing a $Fe_2O_3$ phase) of Experimental Example 11.

(Electrical Conductivity of Joining Material)

After a hole having a diameter of 5 mm was formed in a part of the joining portion of a joined body so as to expose the joining material. An Ag electrode having a diameter of 3 mm was baked on the exposed joining material portion, and the electrical resistance was measured by bringing a measurement needle into contact therewith. The resistance, thus measured was converted into the volume resistivity using the electrode area and the distance between terminals, and the reciprocal thereof was obtained, as the electrical conductivity. An electrical conductivity of $10^{-2}$ S/cm or more obtained as described above was ranked as "A", an electrical conductivity of $10^{-5}$ to less than $10^{-2}$ was ranked as "B", an electrical conductivity of $10^{-6}$ to less than $10^{-5}$ S/cm was ranked as "C", and an electrical conductivity of less than $10^{-6}$ S/cm or an electrical conductivity which could not be measured was ranked as "D".

(Bending Strength of Joining Material)

Figure 7:
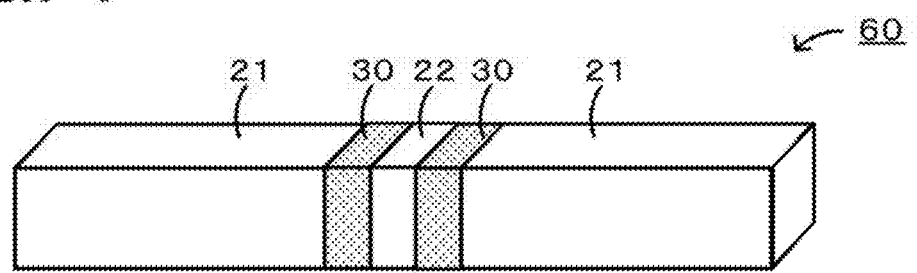
FIG. 7 is an explanatory view of a joined body 60 for mechanical strength measurement.

The joining strength of the joined body was evaluated by a four-point bending test in accordance with JIS-R1632. In Experimental Examples 1 to 13, after two Si-bonded SiC honeycomb bodies each obtained by cutting to haw a size of 1.0×20×40 mm and a SUS430 plate having a, thickness of 0.05 mm were joined together using the joining material described above to form the joined body, evaluation was then performed by applying a load thereto. FIG. 7 is an explanatory view of a joined body 60 for mechanical strength measurement. The first member 21 is a Si-bonded SiC porous body, and the second member 22 is a SUS430 plate. A joining strength of 3.5 MPa or more measured by the bending strength was ranked as "A", a joining strength of 2.0 to less than 3.5 was ranked as "B", a joining strength of 1.0 to less than 2.0 MPa was ranked as "C", and a joining strength of less than 1.0 MPa or a joining strength which could not be measured was ranked as "D". Incidentally, a joining strength of 3.5 MPa is a mechanical strength of a Si-bonded SiC sintered body, and hence the joining strength of the sample ranked as "A" was higher than the mechanical strength described above.

(Heat Resistance Test)

In a heat resistance test, evaluation was performed by measuring the electrical conductivity and the bending strength of the joining material after the sample was held, in the air at 850° C. for 24 hours.

(Comprehensive Evaluation)

In accordance with the measurement results described above, the comprehensive evaluation of each sample was performed. The evaluation result of each joined body before the heat resistance test is regarded as the initial characteristic evaluation. For the evaluation after the heat resistance test, a sample in which the change in electrical conductivity (S/cm) was one digit or less, and the change in joining strength was within 10% was ranked as "A", a sample in which although the change in electrical conductivity (S/cm) was two digits or more, the electrical conductivity itself was $10^{-6}$ S/cm or more was ranked as "B", a sample in which the above change was two digits or more, and the electrical conductivity itself was less than $10^{-6}$ S/cm was ranked as "C", and a sample in which the change in joining strength was more than 10% was ranked as "D". For the comprehensive evaluation, in the initial characteristics and the heat resistance test, a sample was ranked as "A" in which all were ranked as "A" or in which although only one was ranked as "B", the other were all ranked as "A". In addition, in the initial characteristics and the heat resistance test, a sample was ranked as "B" in which although, at least fcwo were ranked as "B", the other were all ranked as "A". In addition, in the initial characteristics and the heat resistance test, a sample was ranked as "C" in which at least one was ranked as "C". In addition, in the initial characteristics and die heat resistance test, a sample was ranked as "D" in which at least one was ranked as "D" or was not measurable,

TABLE 1

| Experimental Example | First Member | Second Member | Raw Material of Joining Material | Amount of Ni % by mass | Joining Atmosphere | Joining Temperature ° C. |
|---|---|---|---|---|---|---|
| 1 | Si-bonded SiC | SUS | Ni solder | 90 | Vacuum | 1045 |
| 2 | | | Ag solder | 0 | Vacuum | 820 |
| 3 | | | Cu—Mn solder | 0 | Vacuum | 980 |
| 4 | | | FeNi alloy | 50 | Vacuum | 950 |
| 5 | | | Fe | 0 | Air | 750 |
| 6 | | | Fe,TiO$_2$ | 0 | Air | 750 |
| 7 | | | Fe | 0 | Air | 750 |
| 8 | | | Fe,NiO | 2 | Air | 750 |
| 9 | | | Fe,NiO | 5 | Air | 750 |
| 10 | | | Fe,NiO | 10 | Air | 750 |
| 11 | | | Fe,NiO | 5 | Air | 750 |
| 12 | | | Fe,NiO | 5 | Air | 750 |
| 13 | | | Fe,NiO | 5 | Air | 750 |

[Results and Discussion]

The measurement results of Experimental Examples 1 to 10 are shown, in Table 2. In Table 2, the materials of the first member and the second member, the material of the joining portion, the initial characteristics (such as the thickness of the reaction layer), the characteristics after the heat resistance test, and the comprehensive evaluation are collectively shown. In addition, the measurement results of Experimental Examples 11 to 0.13 are collectively shown in Table 3. In Table 3, the joining atmosphere, the joining temperature, the thicknesses of the first layer, the second layer, and the mixed layer, the ratio therebetween, the thickness of the reaction layer, the initial characteristics, the characteristics after the heat resistance test, and the comprehensive evaluation are collectively shown. As shown in Table 2, it was found that the transition metal of the joining portion was preferably Fe, and that when the boding was performed using an oxide thereof, the generation of the reaction layer could be prevented. In addition, it was found that a $Fe_3O_4$ phase was preferable in terms of the electrically conductive properties and the mechanical strength. In addition, it was found that when NiO was added to the transition metal (Fe) which was the primary component of the joining portion, the thermal stability could be enhanced probably by the solid solution of Ni in the Fe oxide. It was inferred that as this additive, in relationship with the properties of Fe, in addition to Ni, an element capable of forming a spinel structure, such as Mn, Co, Cu, or Zn, may also have the effect. In addition, as shown in Table 3, it was found that in Experimental Examples 11 to 13 in which the joining portion had the first layer, the second layer, and the mixed layer from the first member to the second matter, the electrical conductivity and the heat resistance (bending strength) were excellent. It was found that in this joining portion, with respect to the total thickness of the joining portion, when the thickness of the mixed layer was in a range of 10% to 85%, the thickness of the second layer was in a range of 9% to 70%, and the thickness of the first layer was in a range of 1.5% to 15%, the electrical conductivity and the heat resistance (bending strength) were excellent.

TABLE 2

| Experimental Example | First Member | Second Member | Joining Material | Joining Atmosphere | Joining Temperature °C. | Initial Characteristics | | | | Characteristics after Heat resistance Test | | | Comprehensive Evaluation |
|---|---|---|---|---|---|---|---|---|---|---|---|---|---|
| | | | | | | Thickness of Reaction Layer Formed at Interface of First Member μm | Electrical Conductivity of Joined Body | Joining Strength | Evaluation | Change in Electrical Conductivity of Joined Body | Change in Joining Strength | Evaluation | |
| 1 | Si-bonded SiC | SUS | Ni solder | Vacuum | 1045 | 300 | B | B | B | D | D | D | D |
| 2 | | | Ag solder | Vacuum | 820 | 120 | B | B | B | D | D | D | D |
| 3 | | | Cu—Mn solder | Vacuum | 980 | 150 | B | D | D | D | D | D | D |
| 4 | | | FeNi alloy | Vacuum | 950 | 5 | A | A | A | D | D | D | D |
| 5 | | | $Fe_2O_3,Fe_3O_4$ | Air | 750 | Not Formed | B | A | C | C | A | A | C |
| 6 | | | $(Fe,Ti)_2O_3$ | Air | 750 | Not Formed | A | A | A | A | A | A | A |
| 7 | | | $Fe_3O_4$ | Air | 750 | Not Formed | A | A | A | B | A | B | B |
| 8 | | | $(Fe,Ni)_3O_4$ | Air | 750 | Not Formed | A | A | A | A | A | A | A |
| 9 | | | $(Fe,Ni)_3O_4$ | Air | 750 | Not Formed | A | A | A | A | A | A | A |
| 10 | | | $(Fe,Ni)_3O_4$ | Air | 750 | Not Formed | A | A | A | A | A | A | A |

TABLE 3

| Experimental Example[1] | Joining Atmosphere | Joining Temperature °C. | Thickness of Joining Portion | | | | | | |
|---|---|---|---|---|---|---|---|---|---|
| | | | Total of Joining Portion μm | First layer $Fe_2O_3$ μm | Ratio of First Layer % | Second Layer $Fe_3O_4$ μm | Ratio of Second Layer % | Mixed Layer μm | Ratio of Mixed Layer % |
| 11 | Air | 750 | 301.9 | 6 | 2 | 20.9 | 9.5 | 182.1 | 83.3 |
| 12 | Air | 750 | 306.1 | 8.8 | 2.9 | 82 | 35.6 | 129.2 | 50.5 |
| 13 | Air | 750 | 316 | 9.2 | 2.9 | 101 | 42 | 119.8 | 44 |

| Experimental Example[1] | Thickness of Reaction Layer Formed at Interface of First Member μm | Initial Characteristics | | | Characteristics after Heat Resistance Test | | | Comprehensive Evaluation |
|---|---|---|---|---|---|---|---|---|
| | | Electrical Conductivity of Joined Body | Joining Strength | Evaluation | Change in Electrical Conductivity of Joined Body | Change in Joining Strength | Evaluation | |
| 11 | Not Formed | A | A | A | A | A | A | A |
| 12 | Not Formed | A | A | A | A | A | A | A |
| 13 | Not Formed | A | A | A | A | A | A | A |

[1]The first member is Si-bonded SiC, the second member is SUS.

In addition, the present invention is not limited at all to the examples described above, and of course, it is to be understood that the present invention may be carried out in various modes without departing from the technical scope of the present invention.

The present application claims priority from U.S. Provisional Application No. 62/059,215 filed on Oct. 3, 2014, the entire contents of which are incorporated herein by reference.

What is claimed is:

1. A joined body comprising:
   a first member which is a ceramic containing Si;
   a second member; and
   a joining portion which includes an electrically conductive oxide containing a $Fe_3O_4$ phase and which joins the first member and the second member,
   wherein the joining portion is formed to have a multilayer structure in which from the first member to the second member, a first layer containing a $Fe_2O_3$ phase as a first oxide, a second layer containing a $Fe_3O_4$ phase as a second oxide having a lower Fe valence than that of the first oxide, and a mixed layer containing a Fe metal and the second oxide are formed.

2. The joined body according to claim 1, wherein a reaction layer having the thickness of greater than 3.0 µm is not formed at a joining interface between the joining portion and the first member.

3. The joined body according to claim 1, wherein the joining portion further contains a $Fe_2O_3$ phase.

4. The joined body according to claim 1, wherein the electrically conductive oxide contains, in addition to the Fe, at least one additive selected from Ni, Mn, Co, Cu, and Zn.

5. The joined body according to claim 4, wherein in the electrically conductive oxide, the additive is solid-dissolved in a range of 2 to 20 percent by mass.

6. The joined body according to claim 1,
   wherein the second member has a coefficient of thermal expansion higher than that of the first member.

7. The joined body according to claim 6, wherein in the joining portion, with respect to the total thickness of the joining portion, the thickness of the mixed layer is in a range of 10% to 85%, the thickness of the second layer is in a range of 9% to 70%, and the thickness of the first layer is in a range of 1.5% to 15%.

8. The joined body according to claim 1, wherein the electrical conductivity of the joining body is $1 \times 10^{-1}$ (S/cm) or more.

9. The joined body according to claim 1, wherein the first member is a porous material.

10. The joined body according to claim 1, wherein the first member is a Si-bonded SiC material.

11. The joined body according to claim 1,
    wherein the first member is an electrode terminal protrusion portion formed to have a convex shape or a concave shape,
    the second member is a metal terminal portion which is formed so that a portion to be joined to the electrode terminal protrusion portion has a concave shape or a convex shape complementary to the shape of the electrode terminal protrusion portion, and
    the joining portion electrically connects the electrode terminal protrusion portion and the metal terminal portion at a portion between the concave shape and the convex shape at which the electrode terminal protrusion portion and the metal terminal portion are engaged with each other.

12. The joined body according to claim 11,
    wherein the electrode terminal protrusion portion and the metal terminal portion form no space between a protruding front end of the convex shape and a bottom part of the concave shape, those shapes being complementary to each other, and
    the joining portion electrically connects the electrode terminal protrusion portion and the metal terminal portion at side surface portions of the concave shape and the convex shape at which the electrode terminal protrusion portion and the metal terminal portion are engaged with each other.

13. The joined body according to claim 11, wherein the first member is a part of a honeycomb structural body including a partition wall formed of a porous ceramic which forms and defines a plurality of cells, the cells each functioning as a flow path of a fluid and extending from one end surface to the other end surface; and an outer circumference wall formed along the outermost circumference.

14. The joined body according to claim 1,
    wherein a reaction layer having the thickness of greater than 3.0 µm is not formed at a joining interface between the joining portion and the first member,
    the electrically conductive oxide contains, in addition to the Fe, at least one additive selected from Ni, Mn, Co, Cu, and Zn, and the additive is solid-dissolved in a range of 2 to 20 percent by mass in the electrically conductive oxide.

15. The joined body according to claim 1,
    wherein the first member is an electrode terminal protrusion portion formed to have a convex shape or a concave shape,
    the second member is a metal terminal portion which is formed so that a portion to be joined to the electrode terminal protrusion portion has a concave shape or a convex shape complementary to the shape of the electrode terminal protrusion portion,
    the joining portion electrically connects the electrode terminal protrusion portion and the metal terminal portion at a portion between the concave shape and the convex shape at which the electrode terminal protrusion portion and the metal terminal portion are engaged with each other, and
    a reaction layer having the thickness of greater than 3.0 µm is not formed at a joining interface between the joining portion and the first member.

16. The joined body according to claim 1,
    wherein the electrode terminal protrusion portion and the metal terminal portion form no space between a protruding front end of the convex shape and a bottom part of the concave shape, those shapes being complementary to each other,
    the joining portion electrically connects the electrode terminal protrusion portion and the metal terminal portion at side surface portions of the concave shape and the convex shape at which the electrode terminal protrusion portion and the metal terminal portion are engaged with each other, and
    a reaction layer having the thickness of greater than 3.0 µm is not formed at a joining interface between the joining portion and the first member.

* * * * *

UNITED STATES PATENT AND TRADEMARK OFFICE
CERTIFICATE OF CORRECTION

PATENT NO.       : 9,878,518 B2
APPLICATION NO.  : 14/873311
DATED            : January 30, 2018
INVENTOR(S)      : Yunie Izumi and Yoshimasa Kobayashi It is certified that error appears in the above-identified patent and that said Letters Patent is hereby corrected as shown below:

On the Title Page

Item (57), Abstract, Line 9:
Please change: "to have a multilayer structure in which from the first matter" to -- to have a multilayer structure in which from the first member --

Signed and Sealed this
Eighth Day of May, 2018

Andrei Iancu
*Director of the United States Patent and Trademark Office*